Dec. 1, 1953  C. L. CARELOCK  2,660,941
FENDER ATTACHMENT FOR TRACTOR MOUNTED CULTIVATING UNITS
Filed June 12, 1950
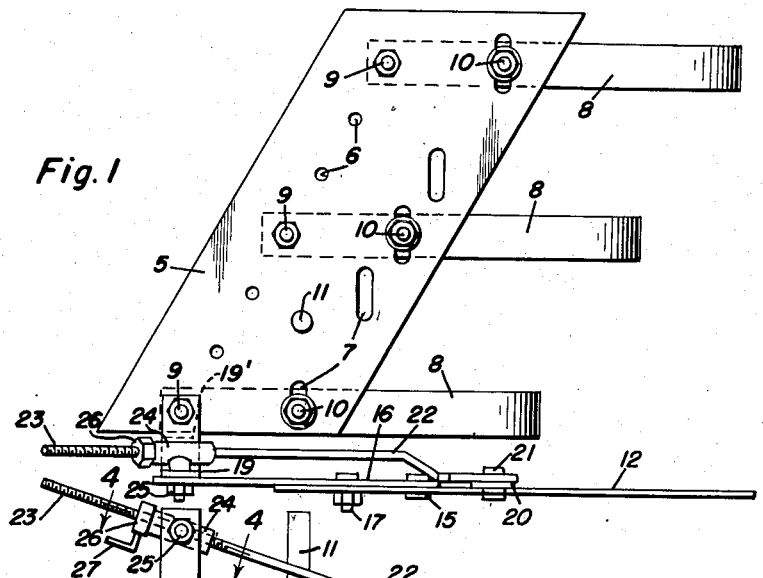
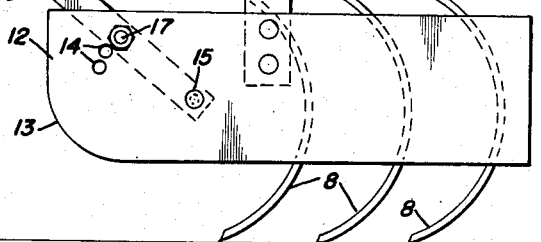
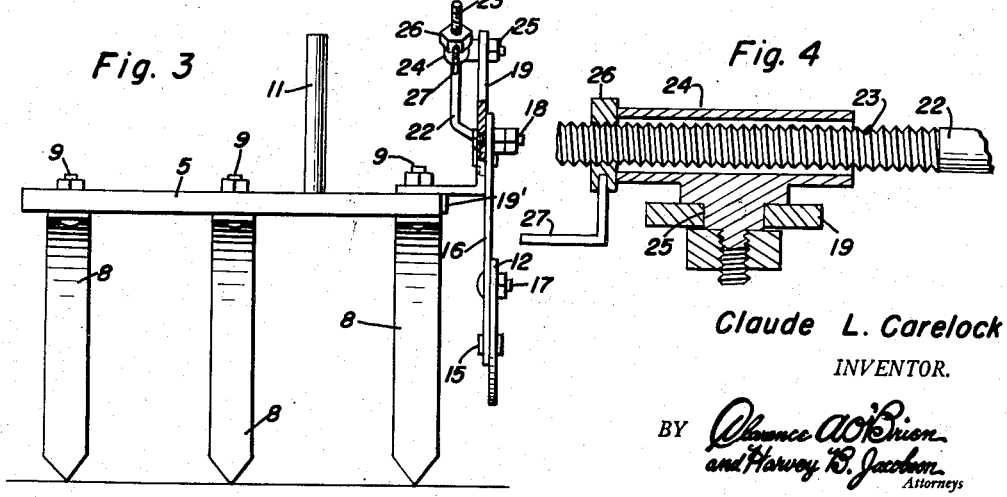
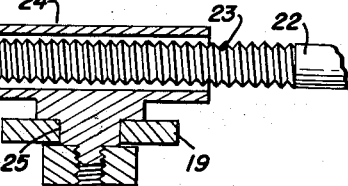
Claude L. Carelock
INVENTOR.

Patented Dec. 1, 1953

2,660,941

UNITED STATES PATENT OFFICE 2,660,941

FENDER ATTACHMENT FOR TRACTOR MOUNTED CULTIVATING UNITS

Claude L. Carelock, Douglas, Ga., assignor of one-half to Claude L. Carelock, Jr., Douglas, Ga.

Application June 12, 1950, Serial No. 167,582

3 Claims. (Cl. 97—188)

This invention relates to tractor mounted spring-tooth cultivating units, and has more particular reference to an improved fender attachment for such units.

The present application is a continuation-in-part of my pending application, Serial No. 643,669, filed January 26, 1946 (forfeited).

An object of the invention is to provide a novel and improved fender attachment of the above kind which may be readily mounted on the tooth supporting plate of the cultivating unit, and which may be readily adjusted in a manner to best meet the conditions encountered in use.

Another object is to provide a fender attachment of the above kind which is simple and durable in construction and efficient in operation.

A practical embodiment of the invention is shown in the accompanying drawing, in which:

Figure 1 is a top plan view of a cultivating unit equipped with a fender attachment embodying the present invention;

Figure 2 is a side elevational view thereof;

Figure 3 is a front elevational view of the same; and,

Figure 4 is an enlarged fragmentary section taken on the line 4—4 of Figure 2.

Referring in detail to the drawing, the present invention is shown as attached to a cultivating unit including an elongated horizontal supporting plate 5, which is of parallelogram shape in plan and is provided with a row of apertures 6 parallel with and near its front edge, and a row of transverse elongated slots 7 near its rear edge, each slot 7 being alined with or disposed directly behind a different one of the apertures 6. A plurality of spring cultivator teeth 8 are removably attached to the plate 5 in transversely spaced relation, the upper or forward end portion of each tooth being secured to the under side of said plate by a nutted pivot bolt 9 passing through an aperture 6 of the plate and the forward end of the tooth, and a nutted clamping bolt 10 passing through said tooth and a slot 7 of said plate which is alined with said aperture. Thus, the teeth may be angularly adjusted about the axes of bolts 9 and secured in adjusted position by the bolts 10 and their nuts. There are more apertures 6 and slots 7 than there are teeth so that the teeth may be bodily adjusted laterally by selecting the particular apertures and slots through which the bolts are disposed to attach the teeth to plate 5. A post 11 is rigid with and extends upwardly from the plate 5 nearer the inner end thereof than the outer end of the same. As shown in the above-mentioned pending application, the post 11 is adapted to support a fixed transverse horizontal shaft carrying a rocker forming part of a means for mounting the unit on a tractor with the plate 5 disposed obliquely of the path of travel, and for raising and lowering said unit.

The present fender attachment includes a flat horizontally elongated and vertically disposed fender plate 12 having a rounded lower front corner 13 and provided near its upper front corner with an arcuate series of apertures 14. The fender plate 12 is pivoted at 15 to the lower rear end of an inclined drawbar 16 at a point concentric with and behind the apertures 14 and for longitudinal tilting adjustment relative to said drawbar. A nutted bolt 17 passes through an aperture of the drawbar and is adapted to pass through an aperture 14 registered therewith to secure the fender plate in adjusted position. The forward end of drawbar 16 is pivoted at 18 to the vertical arm of an angle bracket 19 whose lower horizontal arm is adapted to be bolted by one of the bolts 9 on the inner end of plate 5 so as to position the fender plate beside the innermost tooth 8. A lug 19¹ is provided on the lower arm of bracket 19 and engages the adjacent end edge of plate 5 to prevent said bracket from turning on bolt 9. Fixed to and projecting upwardly from the intermediate portion of the fender plate is an arm 20 to the upper end of which is pivoted at 21 the rear end of a rod 22 having a threaded forward end portion 23. A sleeve 24 is swivelled at 25 to the upper end of the vertical arm of bracket 19 to turn about a transverse axis, and the rod 22 freely extends forwardly through this sleeve. A nut 26 equipped with a handle 27 is adjustably threaded on the end portion 23 of rod 22 and is disposed against the front end of sleeve 24. Thus, the nut 26 may be adjusted longitudinally of rod 22 to adjustably limit downward swinging movement of the fender plate and the drawbar about the pivot 18 or to cause upward adjustment of the fender plate and the drawbar relative to bracket 19 about said bolt 18. In use, the fender plate and the drawbar may freely move up and down about pivot 18 to ride over obstructions on the ground.

From the foregoing description, the construction, operation and advantages of the invention will be apparent. The fender plate acts in the usual well-known manner to prevent soil being thrown by the cultivator teeth onto small plants in the row along-side which the unit is drawn, thereby protecting the plants from injury or being covered by the soil. Minor changes in details of construction may be made without departing from the spirit of the invention as claimed.

Having described the invention, what is claimed as new is:

1. A combined fender and support for use with a cultivating unit including a horizontal supporting plate having spring cultivator teeth attached to the under side thereof, comprising an angle bracket having a horizontal arm adapted to be bolted to an end of the supporting plate and a vertical arm extending upwardly from said horizontal arm, a flat horizontally elongated and vertically disposed fender plate, a rearwardly and downwardly inclined drawbar pivoted at its forward end to the lower portion of said vertical arm and attached at its rear end to the forward portion of said fender plate, an arm fixed to and projecting upwardly from the intermediate portion of said fender plate, a rod pivoted at its rear end to the upper end of the last-named arm and having a threaded forward end portion, a sleeve swivelled to the upper end of the vertical arm of said bracket to turn about a transverse horizontal axis, the forward end portion of said rod freely extending forwardly through said sleeve, and a nut adjustably threaded on the forward end portion of said rod in front of said sleeve to adjustably limit lowering of the fender plate.

2. A combined fender and support for use with a cultivating unit including a horizontal supporting plate having spring cultivator teeth attached to the under side thereof, comprising an angle bracket having a horizontal arm adapted to be bolted to an end of the supporting plate and a vertical arm extending upwardly from said horizontal arm, a flat horizontally elongated and vertically disposed fender plate, a rearwardly and downwardly inclined drawbar pivoted at its forward end to the lower portion of said vertical arm and pivoted at its rear end to the forward portion of said fender plate, an arm fixed to and projecting upwardly from the intermediate portion of said fender plate, a rod pivoted at its rear end to the upper end of the last-named arm and having a threaded forward end portion, a sleeve swivelled to the upper end of the vertical arm of said bracket to turn about a transverse horizontal axis, the forward end portion of said rod freely extending forwardly through said sleeve, a nut adjustably threaded on the forward end portion of said rod in front of said sleeve to adjustably limit lowering of the fender plate, and means coacting with the drawbar and the fender plate forwardly of and concentric with the pivotal connection of said drawbar with said fender plate to secure the latter in longitudinally tilted positions of adjustment relative to said drawbar.

3. For use with a cultivating unit having a horizontal tool supporting plate, a fender and support comprising an angle bracket, said bracket being non-rotatably fixed on said supporting plate, an upstanding arm on said bracket, a longitudinally and vertically arranged fender plate, a rearwardly and downwardly inclined draw bar, the rear end of said draw bar being rigidly fixed to said fender plate adjacent the forward end thereof, the forward end of said draw bar being pivotally mounted to said upstanding bracket arm intermediate the ends thereof, said arm being oscillatable in a vertical plane, an upstanding arm fixed to said fender plate intermediate the ends thereof, a sleeve swiveled to said bracket adjacent the top thereof, an adjusting rod pivoted to said fender arm adjacent the top thereof, said rod extending freely through said sleeve, and an adjusting nut on said rod for limiting motion of said rod in one direction through said sleeve.

CLAUDE L. CARELOCK.

References Cited in the file of this patent

UNITED STATES PATENTS

| Number | Name | Date |
|---|---|---|
| 571,223 | Foster | Nov. 10, 1896 |
| 663,494 | Harris | Dec. 11, 1900 |
| 720,173 | McManmon | Feb. 10, 1903 |
| 966,662 | Danielsen | Aug. 9, 1910 |
| 1,110,048 | Flint | Sept. 8, 1914 |
| 1,518,928 | Hollertz | Dec. 9, 1924 |
| 1,661,985 | Wilson | Mar. 6, 1928 |
| 1,701,414 | Marti | Feb. 5, 1929 |